(12) United States Patent
Sarwary et al.

(10) Patent No.: US 8,984,457 B2
(45) Date of Patent: Mar. 17, 2015

(54) SYSTEM AND METHOD FOR A HYBRID CLOCK DOMAIN CROSSING VERIFICATION

(71) Applicant: Atrenta, Inc., San Jose, CA (US)

(72) Inventors: Mohamed Shaker Sarwary, San Diego, CA (US); Maher Mneimneh, San Jose, CA (US); Mohammad H. Movahed-Ezazi, Saratoga, CA (US)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/864,082

(22) Filed: Apr. 16, 2013

(65) Prior Publication Data

US 2014/0282321 A1  Sep. 18, 2014

Related U.S. Application Data

(60) Provisional application No. 61/786,661, filed on Mar. 15, 2013.

(51) Int. Cl.
  *G06F 17/50* (2006.01)

(52) U.S. Cl.
  CPC .................................. *G06F 17/5031* (2013.01)
  USPC ............................ 716/106; 716/108; 716/132

(58) Field of Classification Search
  None
  See application file for complete search history.

(56) References Cited

U.S. PATENT DOCUMENTS

| | | | |
|---|---|---|---|
| 4,744,084 A | 5/1988 | Beck et al. | |
| 5,095,454 A | 3/1992 | Huang | |
| 7,356,789 B2 | 4/2008 | Ly et al. | |
| 7,454,324 B1* | 11/2008 | Seawright et al. | 703/14 |
| 7,454,728 B2 | 11/2008 | Ly et al. | |
| 7,712,062 B2 | 5/2010 | Ly et al. | |
| 7,840,924 B2 | 11/2010 | Kowatari | |
| 8,024,597 B2 | 9/2011 | Adar et al. | |
| 8,271,918 B2 | 9/2012 | Kwok et al. | |
| 8,533,541 B2* | 9/2013 | Iwashita | 714/700 |
| 8,560,988 B2* | 10/2013 | Sarwary | 716/108 |
| 2010/0199244 A1* | 8/2010 | Kwok et al. | 716/6 |
| 2010/0242003 A1* | 9/2010 | Kwok | 716/5 |
| 2012/0005545 A1* | 1/2012 | Iwashita | 714/724 |
| 2012/0042294 A1* | 2/2012 | Sarwary | 716/108 |
| 2012/0233514 A1 | 9/2012 | Patil et al. | |

\* cited by examiner

*Primary Examiner* — Leigh Garbowski
(74) *Attorney, Agent, or Firm* — Thomas Schneck; Mark Protsik

(57) ABSTRACT

A method of hybrid clock domain crossing (CDC) verification includes receiving a design or an integrated circuit (IC) design constraints. Static CDC verification is performed, including structural and functional verification. The result is checked and explicit or implicit assumptions are made to signoff verification. Incomplete formal analysis results are discarded after review. Assertions and monitors are generated by this process to capture the assumptions and check partially covered properties by formal analysis. A dynamic simulation is run using a testbench, the generated assertions and the monitors. The static verification and dynamic verification processes may be repeated until a satisfactory coverage is obtained. A system, such as a computer aided design (CAD) system, is configured to perform CDC verification of the IC design. The system may generate assertions and monitors to then run a simulation and determine coverage. Results are then reiterated through the system back to the static CDC verification.

17 Claims, 3 Drawing Sheets

SYSTEM AND METHOD FOR A HYBRID CLOCK DOMAIN CROSSING VERIFICATION

CROSS-REFERENCE TO RELATED APPLICATION

The present invention claims priority under 35' U.S.C. 119(e) from prior U.S. provisional application No. 61/786,661, filed on Mar. 15, 2013.

TECHNICAL FIELD

The invention generally relates to integrated circuit (IC) verification processes and particularly to clock domain crossing (CDC) verification processes of an IC.

BACKGROUND ART

Clock domain crossing (CDC) verification is useful in the verification process of integrated circuit (IC) design. CDC verification requires a combination of structural and functional analysis followed by a thorough review and debug of issues by the designer. A designer typically makes assumptions based on which constraints are provided to improve accuracy of the analysis and generate fewer violations in a next run. The functional analysis involves computation-intensive analysis which may lead to incomplete analysis (partial proof). A designer may need to decide on the validity of his design with partial results which may be error prone, making for a hard decision. CDC verification cannot be closed without functional verification. Assumptions may be made during CDC verification which are not validated at any point.

FIG. 1 is a flowchart 100 of a method of the prior art of formal CDC verification. In S110 a design of an IC and design constraints of the IC are received. In S120 structural verification is performed. In S130 the result is checked. If the result is a fail, execution continues with S140. Explicit assumptions are made in S140 to fix, assume or waive the design constraints and execution is reiterated to S110. The result of S130 may also be to pass under assumptions, in which case implicit assumptions are made. The result of S130 may also be to continue to functional verification, which is performed in S150. In S160 the result of the functional verification is checked. If the result is a fail, execution continues at S140. If the result is a pass or partial proof, execution ends. CDC verification may be closed with implicit assumptions, explicit assumptions and incomplete analysis.

In light of the deficiencies in the prior art, it would be advantageous to provide a system and method able to discover real design problems and provide clear guidance on when to close the verification process. It would be further advantageous that this process have a reasonable run time.

SUMMARY DISCLOSURE

A programmable system and a method implemented in such a system perform hybrid clock domain crossing (CDC) verification of the design of at least a portion of an integrated circuit. A description of the circuit is received into the system and a static (structural and/or formal) CDC verification is performed by a processor of the system using the received description. Likewise, a set of assertions and monitors are generated by the system from the received circuit description and a simulation of the circuit based on the generated assertions and monitors is performed. Results of the static CDC verification, the generated assertions and monitors, and results of the simulation are stored in a memory accessible by the system. For comprehensive coverage, the steps of static CDC verification, generation of assertions and monitors, and simulation of the circuit may be repeated based on the stored results for at least one additional iteration, which may cease upon achieving coverage better than a specified threshold figure of merit for such coverage. Analyzing the results may yield a modified description of the circuit, which may then be verified by the repeating the preceding steps for the modified circuit. The system includes a processor and memory coupled to the processing unit, the memory containing program instructions that when executed by the processor configure the system to perform the method.

DETAILED DESCRIPTION

A method of hybrid clock domain crossing (CDC) verification includes receiving a design or an integrated circuit (IC) design constraints. Static CDC verification is performed, including structural and functional verification. The result is checked and explicit or implicit assumptions are made to signoff verification. Incomplete formal analysis results are discarded after review. Assertions and monitors are generated by this process to capture the assumptions and check partially covered properties by formal analysis. A dynamic simulation is run using a testbench, the generated assertions and the monitors. The static verification and dynamic verification processes may be repeated until a satisfactory coverage is obtained. A system, such as a computer aided design (CAD) system, is configured to perform CDC verification of the IC design. The system may generate assertions and monitors to then run a simulation and determine coverage. Results are then reiterated through the system back to the static CDC verification.

Figure 1:
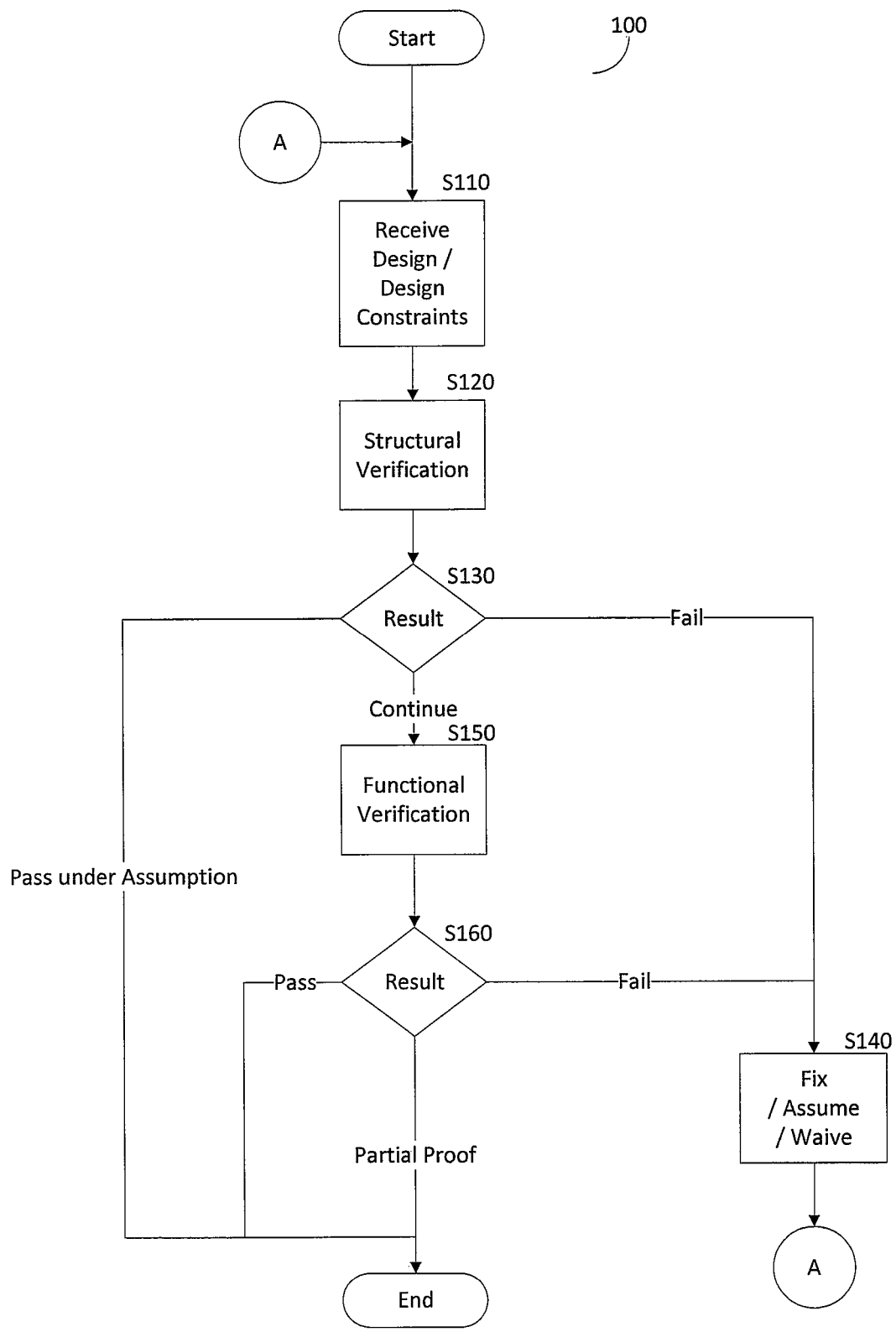
FIG. 1 is a flowchart of a method of the prior art of Formal CDC verification (prior art).
Figure 2:
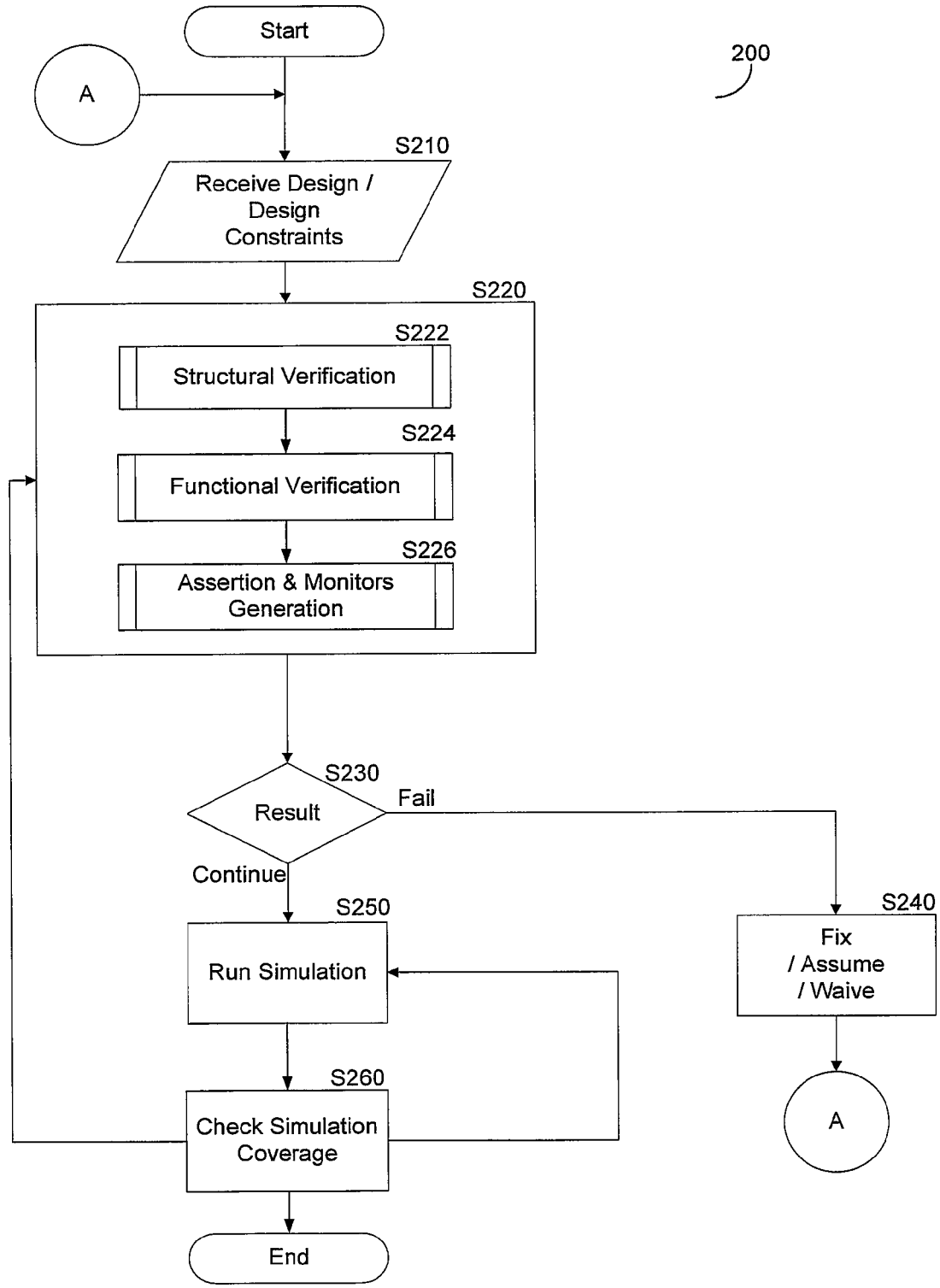
FIG. 2 is a flowchart of Hybrid CDC verification according to an embodiment.

Reference is now made to FIG. 2, which is an exemplary and non-limiting flowchart 200 of Hybrid CDC verification according to an embodiment. In S210 a design of an IC, or portion thereof, or design constraints relating to an IC, or portion thereof, are received. In S220 a static CDC verification is performed and assertions and monitors may be generated (S226). This includes S222 which describes performing structural verification, and S224 which describes performing functional verifications. The result of the static CDC verification is checked in S230. If the result is a fail, execution continues to S240, where explicit assumptions may be made to fix or waive the issues before reiterating to S210. A simulation is run in S250 based on the generated assertions/monitors. In S260 the results of the simulation are checked and simulation is iterated at S250 as needed to improve the dynamic coverage. Additionally, the dynamic coverage for the given monitors and assertions are fed back to the static verification at S220. Using this additional dynamic coverage data, a comprehensive CDC verification coverage may be generated which combines the static verification coverage as well as the dynamic verification coverage. Alternatively, the process may end at S260 automatically or by a designer's input.

Figure 3:
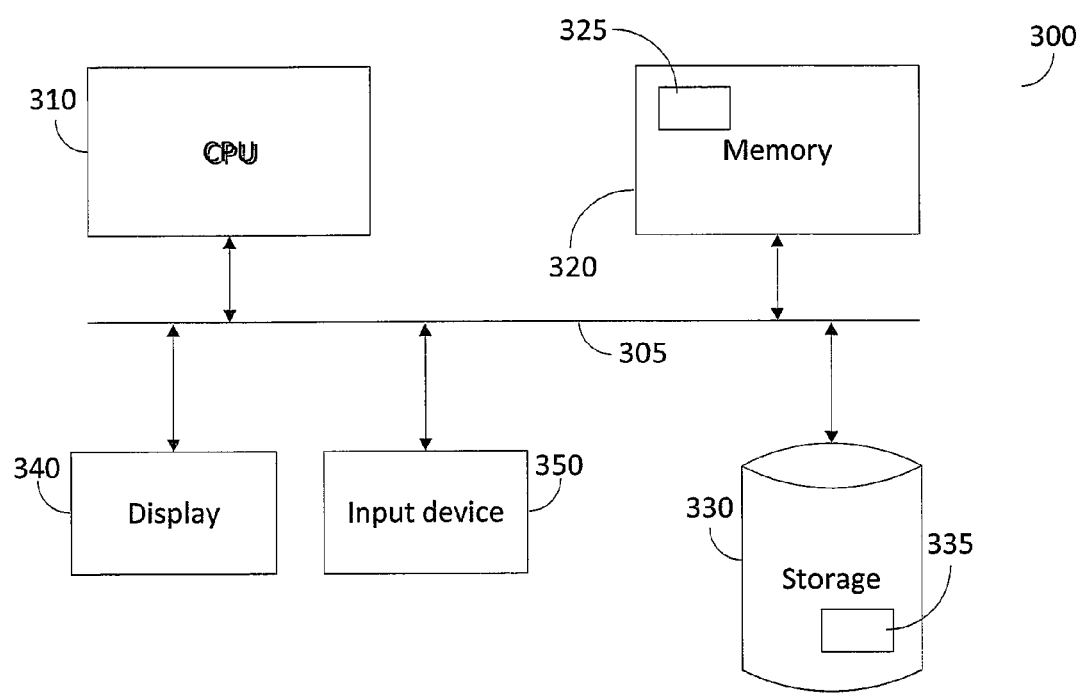
FIG. 3 is a block diagram of a system implemented in accordance with an embodiment.

FIG. 3 shows an exemplary and non-limiting system 300, such as a CAD system, implemented according to an embodiment. The system 300 comprises a processing element 310, for example, a central processing unit (CPU) that is coupled via a bus 305 to a memory 320. The memory 320 further comprises a memory portion 325 that contains instructions that when executed by the processing element 310 performs the method described in more detail herein. The memory may be further used as a working scratch pad for the processing element 310, a temporary storage, and others, as the case may be. The memory may comprise of volatile memory such as, but not limited to random access memory (RAM), or non-volatile memory (NVM), such as, but not limited to, flash memory. The processing element 310 may be coupled to a display unit 340, e.g., a computer screen, an input device 350, e.g., a mouse and/or a keyboard, and a data storage 330. Data storage 330 may be used for the purpose of holding a copy of the method executed in accordance with the disclosed technique. Data storage 330 may further comprise storage portion 335 containing the aforementioned formal CDC verification results, as well as, but not limited to, the results of the aforementioned simulation and any assertions or monitors generated in the process.

The principles of the invention are implemented as hardware, firmware, software or any combination thereof, including but not limited to a CAD system and software products thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

What is claimed is:

1. A method implemented in a programmable system for performing hybrid clock domain crossing (CDC) verification of a description of a circuit, the method comprising:
   receiving into the system a description of the circuit;
   performing static CDC verification from the received description that provides a static CDC verification coverage;
   generating from the received description a set of assertions and monitors respective of the static CDC verification coverage of the circuit;
   performing a simulation of the circuit using a testbench, the generated assertions and monitors to provide a dynamic CDC verification that improves the static CDC verification coverage; and
   storing in memory accessible by the system at least one of: results of the static CDC verification coverage, the dynamic CDC verification coverage, the assertions and monitors, and results of the simulation.

2. The method of claim 1, wherein the circuit is one of an integrated circuit (IC), a portion of an IC.

3. The method of claim 1, wherein static CDC verification comprises at least one of: structural verification, formal verification.

4. The method of claim 3, further comprising: providing a comprehensive coverage by repeating static CDC verification, generation of assertions and monitors and simulation of the circuit for at least one additional iteration based on the stored results.

5. The method of claim 4, further comprising: ceasing the iteration of the verification, generation and simulation steps upon achieving a comprehensive coverage that is better than a threshold coverage figure of merit.

6. The method of claim 1, further comprising:
   analyzing at least one of the static CDC verification results and the dynamic CDC verification results; and
   modifying the description of the circuit.

7. The method of claim 1, wherein at least one of the monitors is generated respective of an assumption made on at least a portion of the circuit.

8. The method of claim 7, wherein the assumption is one of: implicit, explicit.

9. A system for hybrid clock domain crossing (CDC) verification of a description of a circuit, comprising:
   a processing unit; and,
   a memory coupled to the processing unit, the memory containing instructions that when executed by the processing unit, configure the system to: receive a description of a circuit; perform static CDC verification of the circuit from the received description that provides a static CDC verification coverage; generate from the received descriptions a set of assertions and monitors respective of the static CDC verification coverage of the circuit; perform a simulation of the circuit using a testbench, the generated assertions and monitors to provide a dynamic CDC verification coverage that improves the static CDC verification coverage; and store in the memory at least one of: the results of the static CDC verification coverage, the dynamic CDC verification coverage, the assertions and monitors, and results of the simulation.

10. The system of claim 9, wherein the circuit is one of: an integrated circuit (IC), a portion of an IC.

11. The system of claim 9, wherein CDC verification comprises at least one of: structural verification, formal verification.

12. The system of claim 11, wherein the memory further contains instructions that when executed by the processing unit, configure the system to provide a comprehensive coverage by repeating static CDC verification, generation of assertions and monitors and simulation for at least one additional iteration based on the stored results in the memory.

13. The system of claim 12, wherein the memory further contains instructions that when executed by the processing unit, configure the system to cease the iteration of the verification, generation and simulation steps upon achieving a comprehensive coverage that is better than a threshold coverage figure of merit.

14. The system of claim 9, wherein the memory further contains instructions that when executed by the processing unit, configure the system to: analyze at least one of the static CDC verification results and the dynamic CDC verification results; and, modify the description of the circuit.

15. The system of claim 9, wherein the system is a computer aided design (CAD) system.

16. The system of claim 9, wherein at least one of the monitors is generated respective of an assumption made on at least a portion of the circuit.

17. The system of claim 16, wherein the assumption is one of: implicit, explicit.

* * * * *